United States Patent [19]

Bhate

[11] 4,433,279
[45] Feb. 21, 1984

[54] FREE PISTON HEAT ENGINE STABILITY CONTROL SYSTEM

[75] Inventor: Suresh K. Bhate, Niskayuna, N.Y.

[73] Assignee: Mechanical Technology Incorporated, Latham, N.Y.

[21] Appl. No.: 236,460

[22] Filed: Feb. 20, 1981

[51] Int. Cl.³ .................... H02K 35/00; H02P 9/04
[52] U.S. Cl. ............................ 322/3; 290/1 R;
310/15; 322/15; 322/59; 322/100
[58] Field of Search .............. 310/14, 15, 27, 36;
322/3, 90, 94, 95, 2, 100, 14; 290/1 R, 4 R

[56] References Cited

U.S. PATENT DOCUMENTS

| | | | |
|---|---|---|---|
| 2,899,565 | 8/1959 | Turner | 290/1 R |
| 3,234,395 | 2/1966 | Colgate | 290/1 R |
| 3,484,616 | 12/1969 | Baumgardner et al. | 290/1 R |
| 3,604,821 | 9/1971 | Martini . | |
| 3,822,388 | 7/1974 | Martini et al. | 322/2 X |
| 3,891,874 | 6/1975 | Rotors | 310/15 X |
| 4,044,558 | 8/1977 | Benson . | |
| 4,215,548 | 8/1980 | Beremand | 417/383 X |
| 4,291,258 | 9/1981 | Clark et al. | 318/124 |
| 4,345,442 | 8/1982 | Dorman | 62/160 |

*Primary Examiner*—R. J. Hickey
*Attorney, Agent, or Firm*—Joseph V. Claeys; Arthur N. Trausch, III

[57] ABSTRACT

A stability control system for a free piston Stirling engine/alternator power unit whose engine power is an exponential function on the engine piston stroke and whose alternator power demand is also an exponential function of the piston stroke, and wherein the engine exponent is normally equal to or greater than the alternator exponent, includes a connection through a rectifier between the alternator output terminals and the alternator field windings. This increases the alternator exponent above the engine exponent to make the system stable. The large time constant of the field winding inductance, which would tend to slow the response time during transients, can be avoided by adding a suitable resistance in series with the field winding.

4 Claims, 5 Drawing Figures

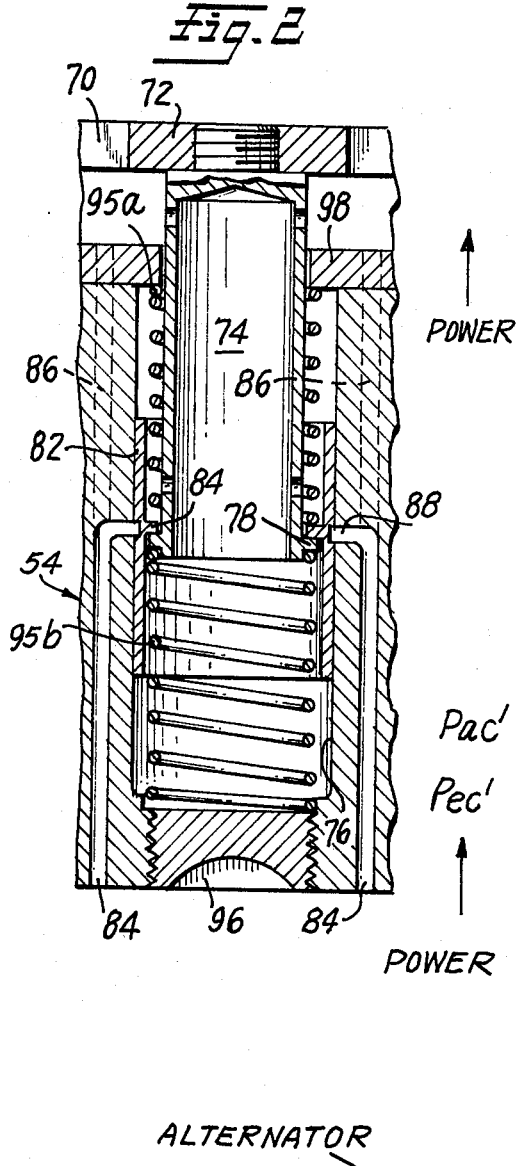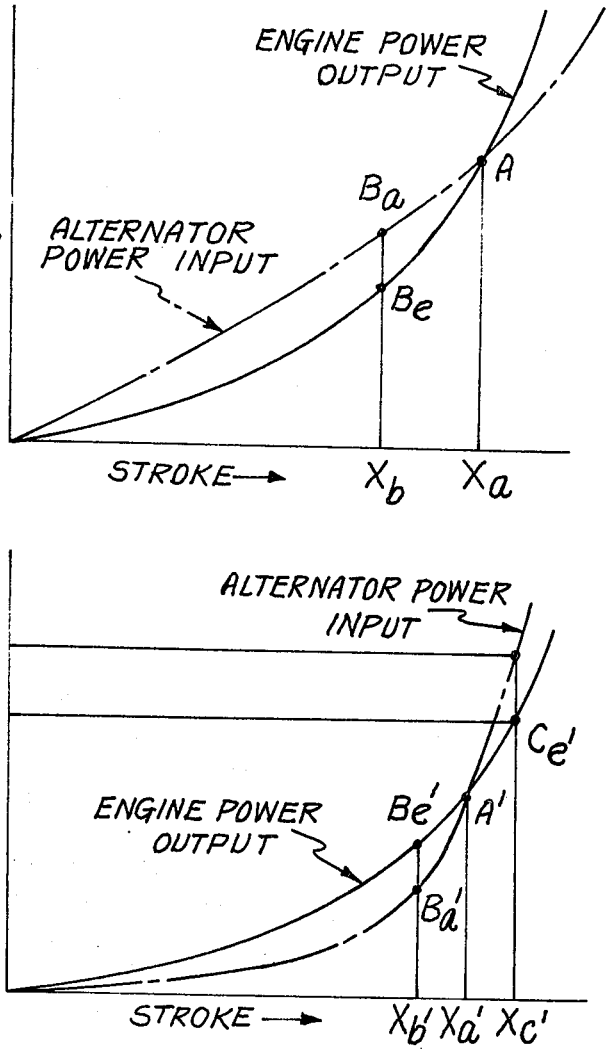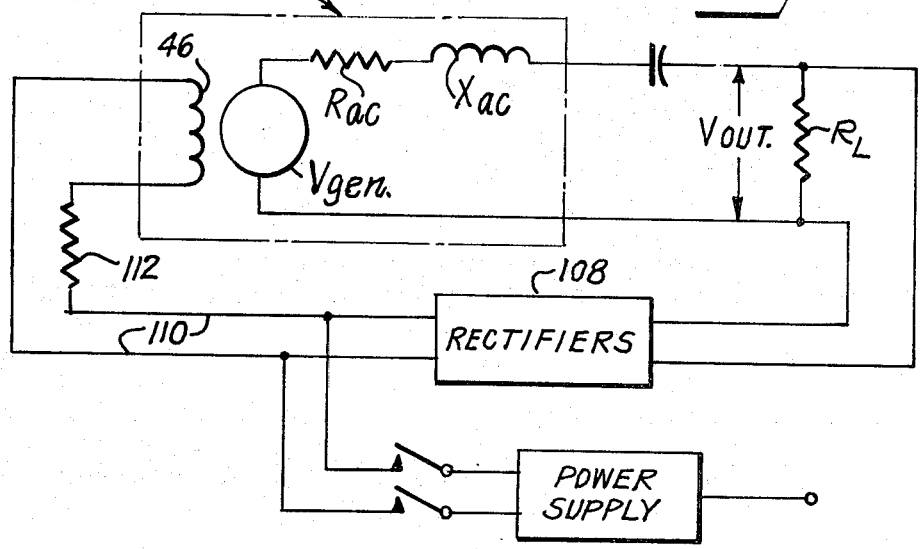

FREE PISTON HEAT ENGINE STABILITY CONTROL SYSTEM

BACKGROUND OF THE INVENTION

This invention relates to a free piston heat engine driven alternator system, and more particularly to a stabilizing control for a power system including a free piston Stirling engine directly driving an oscillating alternator.

The free piston Stirling engine is a technology which has attracted considerable attention recently because of its high potential efficiency and multi-fuel capability. The engine can be hermetically sealed and permanently lubricated by gas bearings so that it may be designed for extremely long life and minimal periodic maintenance requirements.

Significant improvements have been made in this technology in the recent years, as evidenced by the power systems disclosed in U.S. Pat. application Ser. No. 168,714 for "Heat Engine Device" by Harlan V. White, and U.S. Pat. application Ser. No. 168,075, for "Stirling Engine with Diaphragm Coupling between Displacer and Power Piston," of Folsom and Dineen, both filed on July 14, 1980, and U.S. Pat. application Ser. No. 172,373 for "Diaphragm Displacer Stirling Engine Powered Alternator-Compressor," filed on July 25, 1980, by Lawrence R. Folsom, et. al., the disclosures of which are incorporated herein by reference.

Ironically, the great improvements introduced in this technology, as exemplified in the aforementioned applications, have given rise to an unexpected problem. It was found that under some conditions of heater head temperature, engine pressure, cooler temperature, and displacer spring stiffness, the system would become unstable. This was manifested by a tendency for the system to stall down to a very short stroke and very low alternator output, or to run to the opposite extreme with the piston violently striking the stops at both ends of its travel.

The great improvements made to the free piston Stirling engine in efficiency, durability, reliability, and many other aspects of its operation make this engine an ideal candidate for a host of applications including such diverse uses as residential heat pumps, power generators for recreational vehicles, irrigation pumps for remote areas, and power generation for electric vehicles, farm equipment, and space probes. However, in order for these potential applications to be realized it is necessary that the advanced, more sophisticated generations of this technology be stably operable under all conditions of load and load fluctuation.

SUMMARY OF THE INVENTION

Accordingly, it is an object of this invention to provide a stability control system for a free piston heat engine driving an alternator which enables the system to maintain stable operation in all conditions of use. Another object of the invention is to provide a stability maintenance system for a power unit having a free piston Stirling engine driving a linear alternator in which, for the full stroke range of the system, the power-stroke curve of the engine intersects the corresponding curve of the alternator and does so with a slope more shallow than the slope of the alternator curve.

These and other objects of the invention are achieved in the disclosed embodiment wherein the alternator power-stroke curve is made steeper than the engine power-stroke curve by the alternator field coil energized through a rectifier from the alternator output coils so that the field current, rather than constant, is a linear function of alternator stroke and therefore, in the operating range of the device. The alternator input power demands increase and decrease faster with stroke than does the engine power supply to provide a stable system at all operating points.

DESCRIPTION OF THE DRAWINGS

The invention and its many attendant objects and advantages will become better understood by reference to the following detailed description of the preferred embodiment when read in conjunction with the following drawings, wherein:

FIG. 2 is an enlarged fragmentary vertical sectional view, similar to FIG. 1, of the mid-section of the alternator;

FIG. 3 is a curve of an engine driven alternator showing an unstable mode of operation;

FIG. 4 is a curve of an engine driven alternator incorporating the stability control system of this invention; and FIG. 5 is a circuit diagram of a stability control system made in accordance with this invention.

DESCRIPTION OF THE PREFERRED EMBODIMENTS

Figure 1:
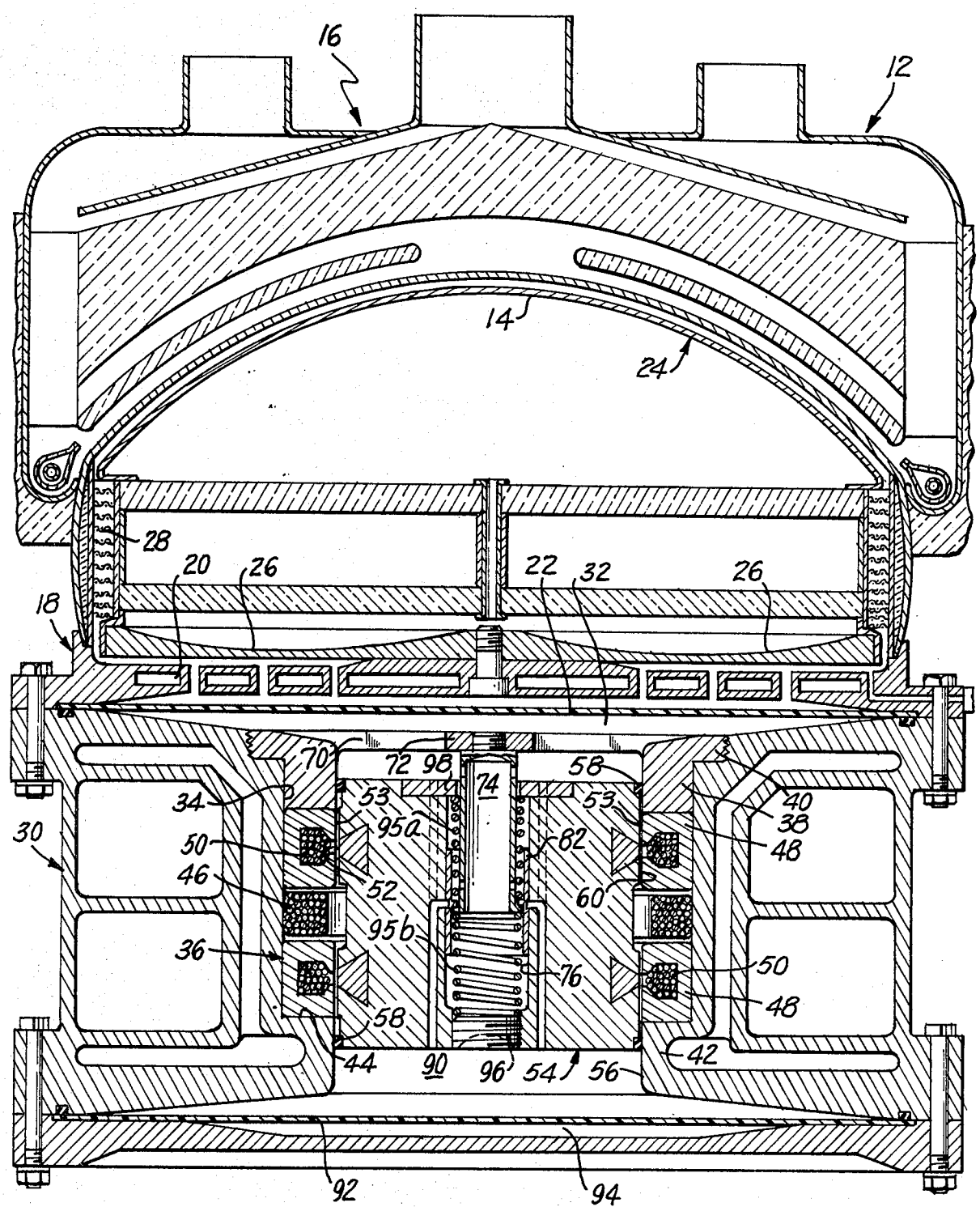
FIG. 1 is a sectional elevation of a free piston Stirling engine driven alternator incorporating the stability control system of this invention.

Referring now to the drawings wherein like reference characters identify identical or corresponding parts, and more particularly to FIG. 1 thereof, a free piston Stirling engine driven alternator is shown incorporating much of the structure of the power unit disclosed in the forementioned U.S. Pat. application Ser. No. 172,373 entitled, "Diaphragm Displacer Stirling Engine Powered Alternator-Compressor" of Lawrence R. Folsom, et al. The compressor and the pressure control system of this power unit are not shown in FIG. 1 for the sake of brevity and so that the invention of this application may be more clearly illustrated. The following description of the power unit formed of the Stirling engine driving the linear alternator merely summarizes the outlines of the system. The structural and functional details of the power unit may be found in the forementioned Folsom, et al. patent application.

The power unit includes a diaphragm displacer Stirling engine 12 having a heater head 14 heated by a combustor 16. The lower end of the heater head 14 is connected to a cooler base 18 containing channels 20 for circulation of a cooling liquid such as water or liquid Freon. A diaphragm 22 extends across and seals the lower end of the cooler base 18 and constitutes a flexible wall of an enclosed working space defined within the heater head 14, the cooler base 18, and the diaphragm 22.

A displacer 24 is mounted for axial oscillation in the working space on a displacer diaphragm 26 which is connected at its outer peripheral edge to the displacer 24 and is attached at its center to the cooler base 18. Axial oscillation of the displacer causes the working fluid contained under pressure in the working space to shuttle back and forth between the hot end of the working space under the heater head 14, through a regenerator 28, and into the cold space between the displacer diaphragm 26 and the power diaphragm 22. The pressure wave created in the working gas in the engine 12 causes a periodic deflection of the power diaphragm 22.

The Stirling engine 12 is connected to the top end of an alternator housing 30. The top of the alternator housing 30 is slightly concave to provide a hydraulic chamber 32 between the bottom face of the power diaphragm 22 and the concave upper face of the alternator housing 30. An axial bore 34 is formed through the alternator housing 30 and receives a stator 36 of the alternator. A ring 38 having an externally threaded flange 40 is threaded into the bore 34 and holds the stator 36 in place. The housing 30 has an internally projecting shoulder 42 at the lower end of the bore 34 to provide a step 44 on which the alternator stator 36 sits.

The alternator structure is preferably like the structure disclosed in U.S. Pat. No. 3,891,874 issued to Herbert Roters on June 24, 1975. It includes an annular field coil 46 disposed between a pair of pole annuli 48, each of which contains an AC coil 50. Each pole annulus 48 is formed of an annular stack of radial C-shaped laminations, that includes a central opening which receives one of the annular coils 50, and a gap 52 in the center of the inner edge of the radial laminations communicating with the central opening and dividing each annulus 48 into two axially spaced pole faces 53.

An alternator plunger 54 is slidably disposed in the cylindrical through bore 56 defined by the inner face of the ring 38, the cylindrical opening through the stator, and the inner face of the shoulder 42. The plunger 54 includes a pair of sealing rings 58 which provide radial support and sealing of the plunger 54 in the cylindrical bore 56. The plunger 54 is formed of an angular stack of radial laminations which are radially tapered so that in assembled form they form a solid cylindrical body. Each lamination includes a triangular opening which opens in the radial outer face of the lamination to provide, in the assembled condition, an annular channel of triangular cross section as shown. This annular channel is filled with aluminum, cast in place, to provide a short circuiting compensation coil for the purpose explained in the aforementioned Roters patent.

Each of the radial laminations includes two pairs of pole faces 60, which are aligned, at the plunger midstroke position, with the pole faces 53 on the pole pieces 48 on the armature stator. Each of the pole faces 60 extends above or below the opening of the compensation coil an amount equal to about one half the axial length of the corresponding half of the pole piece which it faces in the centered position of the armature as shown in FIG. 1. Thus, axial reciprocation of the plunger 54 causes the pole faces 60 on the radial laminations of the plunger 54 to alternately link the flux of the field coil 46 around first the top and then the bottom AC coil 50 so that the flux alternates between zero and maximum once every cycle of the alternator plunger 54 to induce an alternating voltage in the coils 50.

The ring 38 has a spider 70 formed on its top face. The spider 70 has arms which extend radially inward to a center collar 72 which has an internally threaded hole through the center thereof. In FIG. 2, an axially extending post 74 is threaded into the hole in the collar 72 and extends downwardly into an axial well 76 in the alternator plunger 54. The post 74 terminates at about the axial center of the stator 36 in an outwardly extending flange 78 which engages an inwardly extending flange 84 of a sleeve 82. The sleeve 82 is stationary with respect to the post 74 and the plunger 54 oscillates on the sleeve 82 for the purpose of centering the plunger 54 in the bore 56. This is achieved by a hydraulic centering scheme which has a pair of holes 84 drilled from the bottom face of the plunger 54 to the lateral midplane thereof, and a second pair of holes 86 drilled from the top face of the plunger 54. Both sets of holes communicate with an annular groove 88 in the outer face of the sleeve 82 at the centered position of the plunger 54 so that the hydraulic pressure in the hydraulic chambers above and below the plunger 54 can be equalized at the center position. At all positions other than the center position, the annular groove 88 in the sleeve 82 is misaligned with the inner ends of the holes 84 and 86 so that fluid communication through the armature 54 is shut off.

The lower face of the alternator housing 30 is formed in a concave configuration like the upper face thereof to provide a lower hydraulic chamber 90. The hydraulic chamber 90 is sealed at its lower face by a bounce diaphragm 92 which separates the hydraulic chamber 90 from a bounce space 94 filled with engine working gas such as helium. When the alternator plunger 54 is driven downwardly by the power stroke of the engine 12, the hydraulic fluid in the hydraulic chamber 90 acting on the bounce diaphragm 92 flexes the bounce diaphragm 92 into the bounce space 94 and compresses the gas therein. At the end of engine power stroke, the engine pressure drops and the alternator plunger is driven upward by the expansion of the gas in the bounce space acting through the bounce diaphragm 92 on the hydraulic fluid in the lower hydraulic chamber 90 to move the alternator plunger upward. A pair of centering springs 95a and 95b assist in centering the alternator plunger 54. The spring 95b bears against a bottom plug 96 which is threaded into and closes the plunger well 76, and the spring 95a bears against a ring 98 which is fastened to the top of the plunger 54 at the top of the well 76 around the post 74.

The instability which can occur in a power unit of this nature, that is, a Stirling engine driving a linear alternator, arises when the engine exponent is greater than or about equal to the alternator exponent on power vs. stroke diagram. This situation is illustrated in FIG. 3 which shows the engine power as a function of engine stroke. In the disclosed embodiment, the engine stroke is the displacement of the engine diaphragm 22, and the alternator stroke is the axial movement of the alternator armature 54. However, since these two movements are linked by an incompressible fluid, namely the hydraulic fluid in the hydraulic chamber 32, the two strokes are directly proportional and therefore may be accurately depicted on a single stroke scale. Therefore, for this discussion, stroke will be considered as a single value for both the engine and the alternator.

The engine power is approximated by the expression $$P_e = c_1 x^B$$

where
$P_e$ = engine power output
$x$ = stroke
$c_1$ and $B$ = constants.

The exponent B is the engine exponent and determines the slope of the engine power curve at any particular engine stroke. A corresponding curve exists for the alternator. An alternator exponent characterizes the alternator power input curve. The alternator power curve for the linear alternator illustrated, when driven by a constant voltage supply to the field coil, is approximated by the following expression:

$$P_a = c_2 x^2$$

where
$P_a$ = mechanical power input to the alternator
$c_2$ = constant.

The law of conservation of energy requires that for stable steadystate operation, $$P_e = P_a$$

(where losses are assumed included in $P_a$) which, in turn, requires that the engine power curve intersect the alternator power curve. That point of intersection will be the point of operation of the system. If the engine exponent B is different from the alternator exponent 2, it is possible for the two curves to intersect. The point of intersection, and hence the operating stroke, can then be varied by suitably adjusting the values of the coefficients $c_1$ and $c_2$ by changing the engine conditions, such as heater head temperature, gas spring pressures, coolant temperatures, etc. on the engine side and by changing the value of the field current, load resistance, etc. on the alternator side. However, when the engine exponent B is very close to or greater than the alternator exponent 2 a very slight change in values of $c_1$ or $c_2$ can result in the point of intersection moving out of the operating range of stroke.

If the engine exponent is greater than the alternator exponent 2, the operation will be unstable. To illustrate, in FIG. 3 the system operating point is at the point of intersection A of the engine and alternator power curves. If a small perturbation in the engine operation causes the stroke to reduce from $x_a$ to $x_b$, the power developed by the engine will be reduced to $B_e$. The alternator power demand at the same stroke is shown on the alternator power curve at $B_a$. Since the alternator power demand is higher than the power supplied by the engine at that stroke, the difference $B_a - B_e$ tends to retard the engine stroke even further. The stroke thus tends to decrease spontaneously until the engine stalls altogether.

If a small perturbation in the engine causes the stroke to increase temporarily, the power developed by the engine is higher than the alternator can absorb at that stroke. This causes the alternator plunger 54 to accelerate and the stroke increase until the plunger reaches the limit of its stroke against the ends of the alternator housing. The operating situation illustrated in FIG. 3 is thus an unstable one because the slope of the engine power curve is greater than the slope of the alternator power curve within the operating range of the system.

Turning now to FIG. 4, a stable operating situation is illustrated. The alternator exponent has been changed to produce a much steeper power curve within the operating range of the system. When a perturbation occurs which causes the engine stroke to momentarily decrease from point $X'_a$ to point $X'_b$ on the curve, the power demand of the alternator at that stroke will be less than the power available from the engine and therefore the stroke will tend to increase back toward the operating point A'. If the perturbation in the engine causes the stroke momentarily to increase to point $X'_c$ for example, the alternator power demand $P_{ac'}$ at that stroke will be greater than the engine can supply and therefore the engine stroke will tend to decrease back toward the operating point A'. This represents a stable operating situation.

In order to achieve the desired result, it is necessary to adjust the relative exponents of the engine and alternator power curve in order to achieve an intersection within the operating range of the system and to make the slope of the alternator power curve greater than the engine power curve within the operating range. This is achieved in one embodiment by making the alternator field current a function of the alternator stroke and therefore raising the alternator exponent from its normal value of 2 to a higher value.

The preferred embodiment of this invention shown in FIG. 5 is one technique for achieving these results. The circuit produces a field current in the alternator field coil or windings 46 that is linearly proportional to the alternator output voltage. The output voltage Vo is induced in the two AC coils 50 by motion of the alternator plunger 54 alternately linking the flux of the field coil 46 around the coils 50. The resistance Rac and inductive reactance Xac of the AC coils 50 is shown in the circuit diagrams. A capacitor is provided between the load and the alternator to cancel the effect of the inductive reactance Xac of the AC coils 50. The output voltage of the alternator appears across the load resistance $R_L$.

A rectifier 108 is connected in parallel to the load resistance $R_L$ across the alternator output coils 50. The rectifier 108 converts the AC voltage from the AC coils 50 to DC voltage and this direct current is applied to the alternator field windings 46 by conductors 110, resulting in the DC current in the field windings 46 being linearly proportional to the output voltage.

In the steady-state condition, the AC voltage output from the alternator is rectified by the rectifiers 108 to a DC voltage which is applied to the field windings 46. The alternator field current will therefore be linearly proportional to the alternator voltage. Since the flux produced by the field windings 46 is not linearly related to the current in the AC coil 50 due to the saturation of the iron parts of the magnetic circuit, as is well known to those skilled in the art, the generated voltage, $V_{gen}$ is not linearly proportional to the field current and consequentially not proportional to the alternator voltage $V_{out}$. As the generated voltage is dependent on the alternator voltage through the variation of the DC flux, the alternator output power will be proportional to an exponential power of the alternator stroke higher than two. In a transient situation, the high inductance of the field winding will tend to resist changes in the field current which would slow the response time of the field coils to the transients, and thereby tend to reduce the alternator exponent. To decrease the response time of the field coil to the transients produced by changes in alternator plunger stroke, a resistor 112 is connected in series with the field coil.

The invention thus provides a stability control or maintenance system for a power unit having a free piston Stirling engine driving a linear alternator. The system maintains the power unit stability at all operating conditions within the stroke range of the engine and the alternator. In addition, the system enables the power unit to operate on its own power without dependence on an external power grid.

Obviously, numerous modifications and variations of the disclosed preferred embodiment will occur to those skilled in the art upon reading the foregoing description.

Therefore, it is expressly to be understood that these modifications and their equivalents may be practiced while remaining within the spirit and scope of the invention as defined in the following claims, wherein I claim:

1. A stability control system for a Free Piston Stirling Engine driving a linear alternator having field windings and an armature in the form of a plunger and wherein said alternator output voltage is a function of plunger stroke and current in the field windings, and the engine power is a function of plunger stroke, comprising:

an electrical circuit coupled between the output of said alternator and the input of said field windings for controlling the current to said field windings as a function of said alternator output voltage so that the change in power demand of said alternator with change in stroke is greater than the change in power supplied by said engine with changes of stroke, whereby said Free Piston Stirling Engine operation is stable.

2. The system defined in claim 1, wherein said circuit includes a rectifier connected between the output of said alternator and the input of said field windings.

3. The system defined in claim 2, further comprising a resistance connected in series between said rectifier and said field windings to reduce the response time of said field windings to transients from said rectifier.

4. A stability control system for a Free Piston Stirling Engine-alternator system comprises:

a linear alternator having field windings and an armature in the form of a plunger;

means drivingly coupling said plunger with the Free Piston Stirling Engine whereby the alternator output voltage is a function of plunger stroke and the engine power is a function of plunger stroke;

an electrical circuit circuit coupled between the output of said alternator and the input of said field windings for controlling the current to said field windings as a function of said alternator output voltage so that the change in power demand of said alternator with change in stroke is greater than the change in power supplied by said engine with changes of stroke, whereby said Free Piston Stirling Engine operation is stable.

* * * * *